Nov. 3, 1936. E. F. W. ALEXANDERSON Re. 20,153

SIGNALING

Original Filed June 16, 1928 2 Sheets-Sheet 1

INVENTOR
ERNST F.W. ALEXANDERSON
BY Fred W. Adams
ATTORNEY

Nov. 3, 1936. E. F. W. ALEXANDERSON Re. 20,153

SIGNALING

Original Filed June 16, 1928 2 Sheets-Sheet 2

INVENTOR
ERNST F.W. ALEXANDERSON
BY Ira J. Adams
ATTORNEY

Reissued Nov. 3, 1936

Re. 20,153

UNITED STATES PATENT OFFICE 20,153

SIGNALING

Ernst F. W. Alexanderson, Schenectady, N. Y., assignor to Radio Corporation of America, a corporation of Delaware Original No. 1,839,455, dated January 5, 1932, Serial No. 285,927, June 16, 1928. Renewed August 23, 1929. Application for reissue October 30, 1933, Serial No. 695,935

20 Claims. (Cl. 178—5)

This invention relates to signaling, and more particularly to picture transmission.

In picture transmission it is customary to scan the picture, obtaining light energy which is modulated in accordance with the shading of the picture. By transmitting signaling energy which is similarly modulated the picture may be reproduced with excellent quality. It is sometimes desirable, however, to transmit signaling energy of constant intensity, but so interrupted into marking and spacing periods that the reproduced picture, while not continuously shaded, will, nevertheless, present to the eye apparent shading similar to that which would be produced by modulated signaling. The advantage of on and off signaling is that of simplification of apparatus, and more especially the fact that regular code transmission apparatus may be employed for picture work.

From what has so far been said it is obvious that there is needed a method of changing continuous electrical energy of modulated intensity into interrupted signaling energy of constant intensity such that the duration of the signaling periods is substantially proportional to the intensity of the modulated energy, and to provide such a method, and means for its practice, is a primary object of my invention. For this purpose I superimpose alternating energy of constant frequency and amplitude, which may be termed "interrupter energy", on the modulated energy, and by means of a sensitive mechanical relay, or a properly adjusted electron relay, cause the signaling energy to flow only when the superimposed wave exceeds a predetermined mean value in amplitude.

For the purpose of modulating electrical energy in accordance with the light intensity of the picture and of thereafter amplifying the modulated energy it is sometimes advantageous to have the electrical energy in the form of high frequency alternating energy, rather than continuous current, and to provide such high frequency modulated energy is a further object of my invention, which I fulfill by interposing between the picture and the photoelectric means responsive to the light energy therefrom a chopper wheel which interrupts the light energy at a high frequency. The resulting high frequency electrical energy may be amplified through transformer coupled amplification stages, and to again provide a continuous modulated wave the high frequency energy may be rectified in a suitable detector tube.

If the frequency of the superimposed interrupter energy does not exceed a frequency of 60 cycles per second a sensitive mechanical relay may be used to control the output of the transmitter, preferably by changing the bias of one of the transmitter tubes. When short wave energy is employed for the signaling carrier it becomes possible to interrupt the transmission at frequencies much higher than 60 cycles, and to so do is advantageous because it greatly improves the quality of the picture reproduced at the receiving station. However, with frequencies of the order of 1000 or 2000 cycles it is not possible to employ a mechanical relay, and to overcome this difficulty is a further object of my invention, which I accomplish by utilizing an electron emission tube, to the input circuit of which transmission energy is fed while the superimposed modulated and interrupter energies are applied to the control electrode of the tube to vary its bias. This bias is chosen so negative that the superimposed wave serves to make the tube conductive only when it exceeds a predetermined mean value in amplitude, and while the transmission is interrupted at the frequency of the interrupter current, the duration of the signaling period during each cycle of the interrupter current depends upon the light intensity of the picture at that instant.

My invention is described more in detail in the following specification, which is accompanied by drawings in which—

Figure 1:
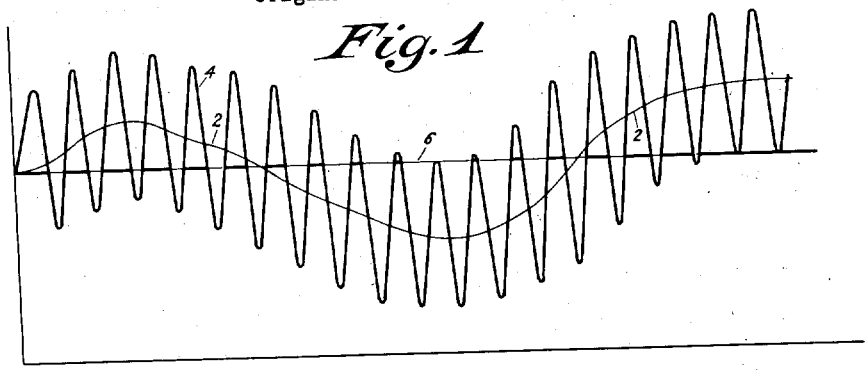
Figure 1 is a drawing explanatory of my invention.

Referring to Figure 1 the value of superimposed modulated and interrupter energies is shown plotted as a function of time. The wave 2 is continuous electrical energy modulated in accordance with the light intensity of the portion of a picture being scanned. The wave 4 is alternating energy, which may range in frequency anywhere from twenty-five to several thousand cycles per second. In the drawings the wave 4 is shown superimposed on the modulated wave 2, and it is obvious, if the superimposed energy is applied to a relay device having a holding or trip potential indicated by the line 6, that the relay will be actuated during periods the lengths of which are dependent upon the value of the modulated energy represented by the wave 2. If the interrupter wave is triangular in shape the relation will be exactly linear, but even employing a sinusoidal wave the results are sufficiently accurate to produce very excellent pictures.

Figure 2:
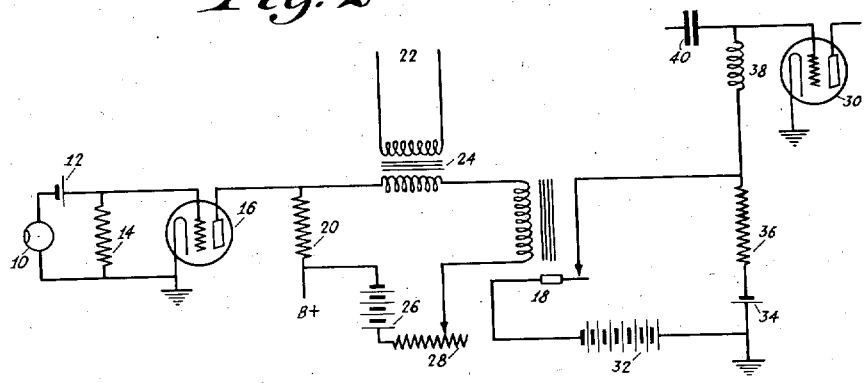
Figure 2 is a wiring diagram for an embodiment of my invention in simplest form.

Referring to Figure 2 there is a photoelectric cell 10 which varies the flow of current from a battery 12 through a resistance 14, and so varies the potential across the input circuit of the tube 16. The amplified output energy is proportional to the light intensity, and is coupled to a suitable relay 18 by means of a coupling resistance 20. Interrupter energy is supplied by the leads 22 through a transformer 24 to the relay circuit. A battery 26 and resistance 28 are employed to properly bias the relay.

The relay is made to key the transmitter by loading the bias of a desired one of the amplifier tubes in the transmitter, indicated at 30. As is evident from the diagram, with the relay closed the bias applied is that of the battery 32, while with the relay open the bias is that of the battery 34. A resistance 36 is provided to prevent one battery from short circuiting the other. The bias potential is applied to the control electrode of the tube 30 through a radio frequency choke 38, while the radio frequency may be fed from the preceding stage through a radio frequency condenser 40.

Figure 3:
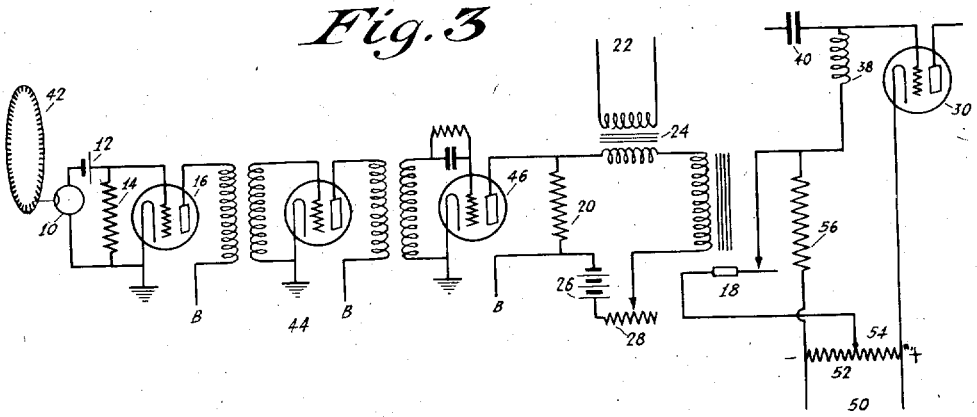
Figure 3 is a modification employing a chopper wheel.

Attention is now directed to Figure 3, which, generally speaking, is similar to the arrangement shown in Figure 2, but in this case a chopper wheel 42 has been shown in the path of the light ray impinging on the photoelectric cell 10. Numerous slots or teeth are cut in this wheel, and when it is rapidly rotated the light energy is interrupted at any desired high frequency, in consequence of which the output of the amplifying tube 16 is high frequency energy, rather than slowly pulsating direct current. The modulated high frequency energy may be readily amplified by transformer coupled electron emission tube stages, such as the stage 44, and converted into pulsating electrical energy by rectification in a suitable detector tube 46. As in Figure 2, the modulated electrical energy and interrupter energy are superimposed and applied to a properly biased relay 18, which serves to load the bias of an amplifier tube 30 of the transmitter.

In this case the bias of the tube 30 is provided from leads 50, across which a potentiometer 52 is connected. When the relay is open the potential of the line 50 is applied to the control electrode of the tube 30, while when the relay is closed the potential at the point 54 is applied thereto. A resistance 56 is provided to prevent the relay from short circuiting the potentiometer. Of course, if it is desired to invert the marking and spacing periods the connections to the potentiometer 52 may be suitably interchanged.

Figure 4:
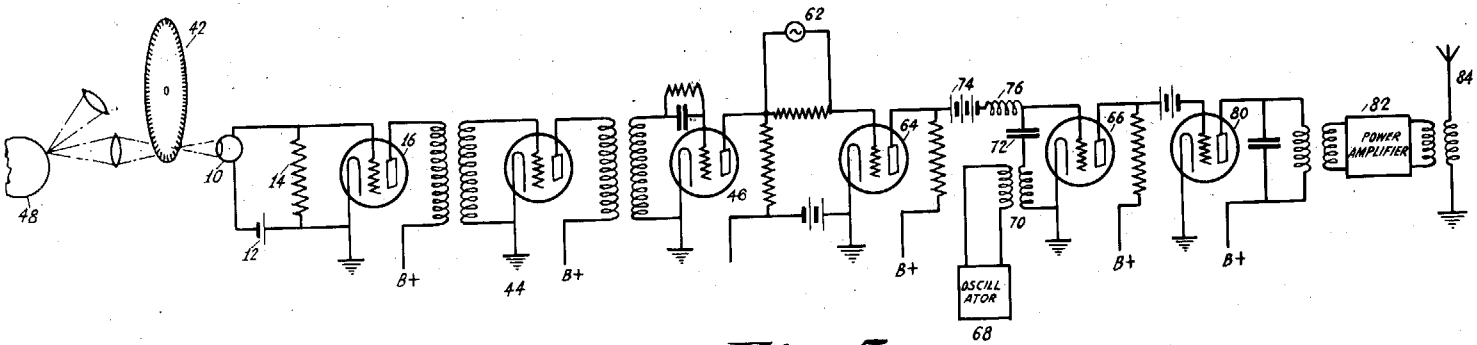
Figure 4 is a modification employing an electron emission tube relay.

It has already been mentioned that if the interruptions in transmission are to take place at higher frequencies than, say 60 cycles per second, it is preferable to employ an electron relay, rather than a mechanical relay, and such an arrangement is indicated in Figure 4. The first part of this arrangement is quite similar to that shown in Figure 3, there being a chopper wheel 42 for interrupting the light energy from a picture mounted on a drum 48, the applied and reflected light energies being suitably focused and concentrated by appropriate lenses. The high frequency modulated electrical energy is amplified in one or more amplifier stages 44, and rectified in a detector tube 46. A source of interrupter energy 62 is superimposed on the output of the detector tube 46, and the superimposed wave may be amplified, if desired, in an amplifying tube 64. The keying relay is indicated at 66, and to its input circuit a source of low powered radio frequency energy 68 is coupled, through a transformer 70 and a radio frequency condenser 72. The steady bias of the tube 66 is provided by means of a bias battery 74, which serves to overcome the anode potential of the tube 64, as well as to establish the normal bias of the tube 66. This bias is varied in accordance with the output of the tube 64, that is, in accordance with the superimposed wave. The interrupter and radio frequencies are separated by means of the condenser 72 and the radio frequency choke 76.

The tube 66 is biased so negative that it only becomes conductive with the aid of the superimposed wave, and therefore passes radio frequency energy from the oscillator 68 only during the peaks of the interrupter wave and for a duration of time dependent upon the magnitude of the modulated energy in the output of the detector tube 46, as was already explained in connection with Figure 1.

Figure 5:
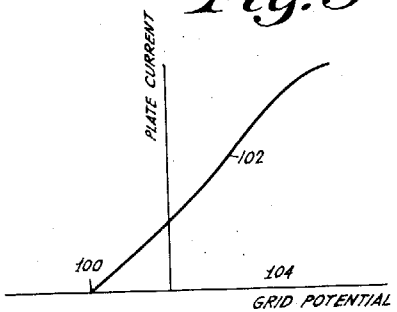
Figure 5 is a graph explanatory of Figure 4.

This may be further explained by referring to Figure 5, which is a graph of the characteristic of the tube 66, showing the plate current plotted as a function of the grid potential. It will be seen that at the point 100, where the characteristic curve 102 and the axis of grid potential 104 cross, is a point above which the tube is conductive, and below which it is not. The tube is operated around the point 100 as a mean potential, and it thereby keys the transmission energy from the oscillator 68.

Again adverting to Figure 4 it will be seen that the interrupted radio frequency output of the tube 66 may be amplified in a tube 80, which preferably is operated as a limiting device in order that its output may be an interrupter radio frequency of constant amplitude. The energy is thereafter amplified in a power amplifier 82, and radiated from a suitable antenna circuit 84. If desired, the power amplifier 82 may be operated with limiting characteristics, so as to aid the action of the tube 80, or even dispense therewith.

It will be understood, of course, that at the receiver the picture may be printed by known means of either the inking, pyro-recording, photographic, or other suitable type.

I claim:

1. The method of transmitting pictures which includes modulating electrical energy in accordance with the light intensity of the picture, superimposing alternating interrupter energy of constant frequency and amplitude on the modulated energy, and radiating signaling energy only when the superimposed wave exceeds a predetermined mean value in amplitude.

2. The method of transmitting pictures which includes chopping the light energy at high frequency, modulating electrical energy in accordance with the chopped light intensity, amplifying the resulting high frequency electrical energy, rectifying it, superimposing thereon alternating interrupter energy of constant frequency and amplitude, and radiating signaling energy only when the superimposed wave exceeds a predetermined value in amplitude.

3. The method of transmitting pictures which includes chopping the light at high frequency, modulating electrical energy in accordance with the chopped light intensity, amplifying the resulting high frequency electrical energy, rectifying it, superimposing thereon alternating interrupter energy of constant frequency and amplitude, applying a radio frequency signaling wave to the control electrode of an electron emission tube, so biasing the control electrode of the tube in response to the superimposed wave that the tube is conductive only when the superimposed wave exceeds a predetermined mean value in amplitude, and amplifying and radiating the tube output.

4. An arrangement for picture transmission comprising photoelectric means for modulating electrical energy in accordance with the light intensity of the transmitted picture, a source of alternating interrupter energy of constant frequency and amplitude, means to superimpose the modulated and interrupter energies, a source of signaling energy, and means for causing the signaling energy to flow only when the superimposed wave exceeds a predetermined mean value in amplitude.

5. An arrangement for picture transmission comprising a chopper wheel for the transmitted light, photoelectric means for modulating electrical energy in accordance with the chopped light intensity, means to amplify the modulated energy, means to rectify the amplified current, a source of alternating interrupter energy of constant frequency and amplitude, means to superimpose the rectified and interrupter energies, a source of signaling energy, and means for radiating the signaling energy only when the superimposed wave exceeds a predetermined mean value in amplitude.

6. An arrangement for picture transmission comprising a chopper wheel for the transmitted light, photoelectric means for modulating electrical energy in accordance with the chopped light intensity, means to amplify the modulated energy, means to rectify the amplified energy, a source of alternating interrupter energy of constant frequency and amplitude, means to superimpose the rectified and interrupter energies, a source of radio frequency signaling energy, an electron emission tube, means to supply the signaling energy to the tube, means for biasing the control electrode of the tube in response to the superimposed wave to make the tube conductive only when the superimposed wave exceeds a predetermined mean value in amplitude, and means to amplify and radiate the resulting interrupted tube output.

7. An arrangement for picture transmission comprising means for modulating electrical energy in accordance with the light intensity of the picture to be transmitted, means for amplifying said modulated energy, means for converting said modulated energy into impulses of constant duration and varying amplitude, a source of alternating interrupter energy of constant frequency and amplitude, means to superimpose the modulated energy and interrupted energy, a source of signaling energy, and means for causing the signaling energy to flow only when the superimposed wave exceeds a predetermined mean value in amplitude.

8. The method of transmitting pictures which includes the step of producing light rays, the intensity of which is characteristic of the picture to be transmitted, interrupting said rays at a constant frequency, producing energy pulses characteristic of said rays, producing an interrupter wave, superimposing said pulses and said wave, and utilizing said superimposed energy to produce constant amplitude high frequency oscillations, the duration of which are a function of the amplitude of the signal modulated energy.

9. The method of transmitting pictures which includes modulating electrical energy in accordance with the light intensity of the picture, superimposing alternating interrupter energy of constant frequency and amplitude on the modulated energy, and controlling a load circuit only when the superimposed wave exceeds a predetermined value in amplitude.

10. The method of transmitting pictures which includes chopping the light energy at high frequency, modulating electrical energy in accordance with the chopped light intensity, amplifying the resulting high frequency electrical energy, rectifying it, superimposing thereon alternating interrupter energy of constant frequency and amplitude, and controlling a load circuit only when the superimposed wave exceeds a predetermined value in amplitude.

11. The method of transmitting pictures which includes chopping the light at high frequency, modulating electrical energy in accordance with the chopped light intensity, amplifying the resulting high frequency electrical energy, rectifying it, superimposing thereon alternating interrupter energy of constant frequency and amplitude, applying a radio frequency signaling wave to the control electrode of an electron emission tube, so biasing the control electrode of the tube in response to the superimposed wave that the tube is conductive only when the superimposed wave exceeds a predetermined value in amplitude, and amplifying the tube output to control a load circuit.

12. An arrangement for picture transmission comprising photoelectric means for modulating electrical energy in accordance with the light intensity of the transmitted picture, a source of alternating interrupter energy of constant frequency and amplitude, means to superimpose the modulated and interrupter energies, a source of signaling energy and means for causing the signaling energy to flow at constant amplitude on when the superimposed wave exceeds a predetermined value in amplitude.

13. An arrangement for picture transmission comprising a chopper wheel for the transmitted light, photoelectric means for modulating electrical energy in accordance with the chopped light intensity, means to amplify the modulated energy, means to rectify the amplified current, a source of alternating interrupter energy of constant frequency and amplitude, means to superimpose the rectified and interrupter energies, a source of signaling energy, and means for radiating the signaling energy only when the superimposed wave exceeds a predetermined value in amplitude.

14. An arrangement for picture transmission comprising a chopper wheel for the transmitted light, photoelectric means for modulating electrical energy in accordance with the chopped light intensity, means to amplify the modulated energy, means to rectify the amplified energy, a source of alternating interrupter energy of constant frequency and amplitude, means to superimpose the rectified and interrupter energies, a source of radio frequency signaling energy, an electron emission tube, means to supply the signaling energy to the tube, means for biasing the control electrode of the tube in response to the superimposed wave to make the tube conductive only when the superimposed wave exceeds a predetermined mean value in amplitude, a load circuit, and means to amplify the resulting interrupted tube output to control the load circuit.

15. In the method of reproducing pictures or the like the step which comprises converting amplitude modulated carrier wave picture signaling impulses into constant amplitude constant frequency impulses and prolonging the duration of each impulse occurring at constant frequency for a time period directly proportional to the variations in amplitude of the picture signals.

16. The method of electrically reproducing half tone prints from a record surface which comprises converting changes in light intensity on elemental areas of the subject into amplitude modulated carrier wave signals and changing the amplitude variations into signaling pulsations of constant frequency and amplitude each of a variable time duration proportional to the amplitude of the picture signals.

17. The method of electrically reproducing half tone prints from a record surface which comprises converting changes in light intensity on elemental areas of the subject into amplitude modulated carrier wave signals and changing the amplitude variations into signaling pulsations of constant frequency constant amplitude and variable time duration proportional to the amplitude of the original signals.

18. In the method of reproducing pictures or the like the step which comprises converting amplitude modulated carrier wave picture signaling impulses into constant amplitude constant frequency impulses, prolonging the duration of each impulse occurring at constant frequency for a time period directly proportional to the variations in amplitude of the original signals, and keying a transmitter by said constant amplitude constant frequency variable duration signals.

19. The method of transmitting signaling energy which includes changing electrical carrier wave energy of amplitude modulated intensity into interrupted signaling energy of constant intensity and causing the duration of the signaling periods to be substantially proportional to the intensity of the amplitude modulated signal.

20. The method of intelligence transmission which comprises the steps of producing an amplitude modulated alternating current, rectifying the amplitude modulated alternating current, producing an auxiliary alternating current of constant frequency and amplitude, combining the rectified alternating current and the auxiliary alternating current, producing a carrier wave, and keying the produced carrier wave in accordance with the amplitude of the rectified alternating current.

ERNST F. W. ALEXANDERSON.